(12) United States Patent
Pham et al.

(10) Patent No.: US 7,077,008 B2
(45) Date of Patent: Jul. 18, 2006

(54) DIFFERENTIAL PRESSURE MEASUREMENT USING BACKSIDE SENSING AND A SINGLE ASIC

(75) Inventors: Tuyen V. Pham, Shelby, NC (US); Gregory D. Parker, Charlotte, NC (US); Phillip I. Lane, Cherryville, NC (US); Richard A. Wade, Shelby, NC (US)

(73) Assignee: Honeywell International Inc., Morristown, NJ (US)

( * ) Notice: Subject to any disclaimer, the term of this patent is extended or adjusted under 35 U.S.C. 154(b) by 24 days.

(21) Appl. No.: 10/924,598

(22) Filed: Aug. 23, 2004

(65) Prior Publication Data

US 2006/0000288 A1    Jan. 5, 2006

Related U.S. Application Data

(60) Provisional application No. 60/584,976, filed on Jul. 2, 2004.

(51) Int. Cl.
*G01L 13/02*    (2006.01)
(52) U.S. Cl. ....................................................... 73/716
(58) Field of Classification Search ................. 73/715, 73/716, 861.52, 861.47
See application file for complete search history.

(56) References Cited

U.S. PATENT DOCUMENTS

| | | | |
|---|---|---|---|
| 4,287,501 A | 9/1981 | Tominaga et al. | |
| 4,790,192 A | 12/1988 | Knecht et al. | |
| 5,101,665 A | 4/1992 | Mizuno | |
| 5,155,061 A | 10/1992 | O'Connor et al. | 437/86 |
| 5,459,351 A | 10/1995 | Bender | 257/417 |
| 5,644,285 A | 7/1997 | Maurer | 338/39 |
| 5,672,832 A * | 9/1997 | Cucci et al. | 73/861.52 |
| 6,140,144 A * | 10/2000 | Najafi et al. | 438/53 |

(Continued)

FOREIGN PATENT DOCUMENTS

EP    0386959    12/1990

(Continued)

OTHER PUBLICATIONS

PCT - Notification of Transmittal of The International Search Report and The Written Opinion of the International Searching Authority, or the Declaration, Date of Mailing Jan. 16, 2006.

*Primary Examiner*—Edward Lefkowitz
*Assistant Examiner*—George P Bonanto
(74) *Attorney, Agent, or Firm*—Kermit D. Lopez; Luis M. Ortiz

(57) ABSTRACT

Differential pressure sensor systems and methods are disclosed, including an absolute pressure sensor composed of a plurality of pressure sense die for detecting sensed media, wherein each of the pressure sense die possess a back side and a front side and are respectively associated with a plurality of varying pressures. The sensed media are applied only at the backside of the pressure sense die, thereby preventing wire bonds and active regions associated with the front side of the pressure sense die from exposure to sensed media and attack from acids and abrasive chemicals associated with the sensed media.

11 Claims, 13 Drawing Sheets

U.S. PATENT DOCUMENTS

| | | | |
|---|---|---|---|
| 6,256,185 B1 * | 7/2001 | Maller | 361/152 |
| 6,346,805 B1 * | 2/2002 | Ermisch et al. | 324/127 |
| 6,591,684 B1 * | 7/2003 | Babala et al. | 73/715 |
| 6,725,725 B1 | 4/2004 | Werner et al. | |
| 6,945,120 B1 * | 9/2005 | Marcus et al. | 73/756 |
| 2002/0029639 A1 * | 3/2002 | Wagner et al. | 73/756 |
| 2002/0189247 A1 * | 12/2002 | Kato et al. | 60/297 |
| 2004/0187588 A1 * | 9/2004 | Miyazawa | 73/716 |
| 2005/0016137 A1 * | 1/2005 | Hamahata et al. | 55/283 |

FOREIGN PATENT DOCUMENTS

| | | |
|---|---|---|
| EP | 0797085 A1 | 9/1997 |
| FR | 2420210 | 12/1979 |
| WO | WO 03/064989 A1 | 8/2003 |
| WO | WO 2004/001360 A1 | 12/2003 |

* cited by examiner

DIFFERENTIAL PRESSURE MEASUREMENT USING BACKSIDE SENSING AND A SINGLE ASIC

REFERENCE TO RELATED APPLICATION

This patent application claims priority under 35 U.S.C. § 119(e) to provisional patent application Ser. No. 60/584,976 entitled "Pressure Sensor Methods and Systems," which was filed on Jul. 2, 2004, the disclosure of which is incorporated herein by reference.

TECHNICAL FIELD

Embodiments are generally related to sensor methods and systems. Embodiments are also related to pressure sensors. Embodiments are additionally related to micromachined pressure sensors, including absolute pressure sensors that include sense die. Embodiments also relate to exhaust back pressure sensors.

BACKGROUND OF THE INVENTION

Many micromachined absolute pressure sensors function by mounting the material removal side of the silicon sense die into glass. Such a methodology can create an absolute pressure sensor. In general, an absolute pressure sensor can employ a sealed volume of gas or vacuum on one side of a diaphragm, with another side of the diaphragm being exposed to a sensed fluid.

An example of a conventional absolute pressure sensor is disclosed in International Patent Publication No. WO 03/064989 A1 to Gregory D. Parker, which published under the Patent Cooperation Treaty (PCT) on Aug. 7, 2003, and is entitled, "An Absolute Micromachined Silicon Pressure Sensor with Backside Hermetic Cover and Method of Making the Same". International Patent Publication No. WO 03/064989 A1 is incorporated herein by reference and generally describes an absolute micromachined pressure sensory geometry that provides resistive or piezoresistive strain gauges, conductive traces, wire bond pads, and other electrical components on a micromachined silicon die.

The problem with such conventional geometric absolute pressure sensor arrangements and relationships is that the wire bond pads and active regions of the sense die end up facing the sensed media. Exhaust gas contains acids and other chemicals that can penetrate protective gels over time and attack the sense die and its wire bonds. Additionally, conventional absolute pressure sensor configurations lack the ability to process pressure and temperature signals from more than one absolute sense die.

A need therefore exists for improved pressure sensor systems and methods in which pressure and temperature sensing signals are converted into the digital realm and calibration functions are implemented to achieve the desired absolute and differential pressure values, followed by conversion back to analog to provide a final output.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for improved sensor methods and systems.

It is another aspect of the present invention to provide for improved pressure sensors.

It is a further aspect of the present invention to provide for an improved exhaust-back pressure sensor.

It is an additional aspect of the present invention to provide for an improved exhaust-back pressure sensor utilizing absolute micromachined pressure sense die.

It is also an aspect of the present invention to provide for an exhaust gas recirculation system module pressure sensor utilizing absolute micromachined pressure sense die.

It is a further aspect of the present invention to provide for a diesel particulate filter sensor using micromachined pressure sense die.

It is yet another aspect of the present invention to provide for differential pressure measurement using backside sensing and one or more application specific integrated circuit (ASIC) devices.

The aforementioned aspects of the invention and other objectives and advantages can now be achieved as described herein. Sensor systems and methods are disclosed herein. An absolute pressure sensor is therefore disclosed herein that includes isolation between the sensor's electronics and the sensed media. The sensor's electronic circuit can incorporate one or more application specific integrated circuit (ASIC) that processes and outputs the signal for both absolute and differential measurements. Such a sensor can be adapted for use in exhaust gas recirculation (EGR) systems utilized on automotive gasoline engines. Such a sensor can also be utilized f0r measuring differential pressure across diesel particulate filters and/or applications in which differential pressure is required for system control and/or monitoring purposes. The absolute pressure sensor disclosed herein can therefore sense the exhaust pressure on automotive engines and other mechanical and/or electromechanical devices and machines.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

An exhaust back pressure sensor using absolute micromachined pressure sense die is disclosed herein. In such a device, an absolute pressure sensor with high isolation between the sensed media and the sensor's electronics can be implemented. Such a sensor can be utilized, for example, to sense the exhaust pressure on automotive engines.

Figure 1:
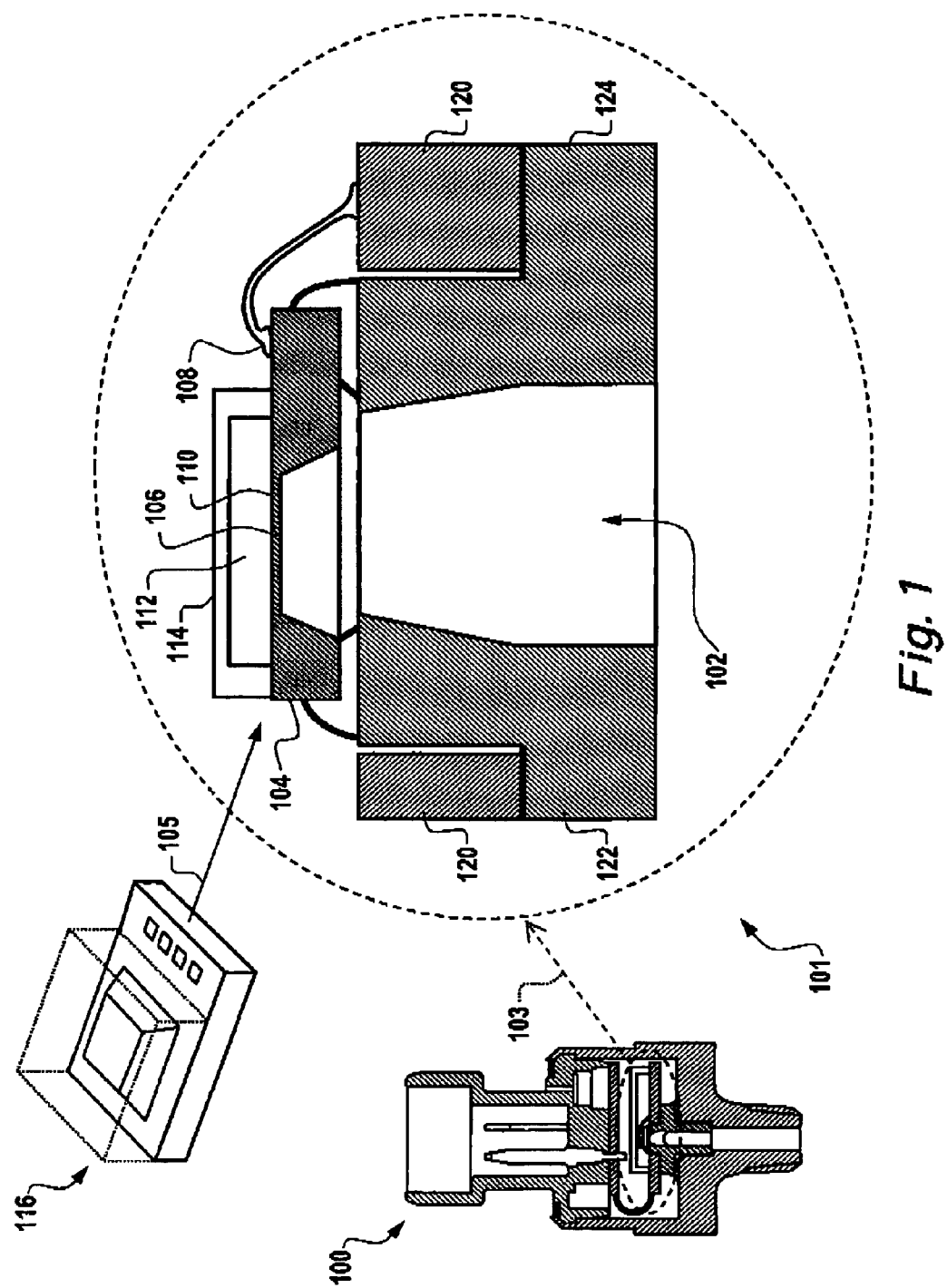
FIG. 1 illustrates an exhaust back pressure sensor system in a piezoelectric sense die configuration, which can be implemented in accordance with a preferred embodiment.

FIG. 1 illustrates an exhaust back pressure sensor system 100 in a piezoelectric sense die configuration, which can be implemented in accordance with a preferred embodiment. Note that in FIGS. 1–5, identical or analogous parts or elements are generally indicated by identical reference numerals. A portion 101 of system 100 is depicted in FIG. 1, as indicated by arrow 103. Portion 101 indicates that in general, a circuit board (e.g., PCB—Printed Circuit Board) 120 can be co-located proximate to a carrier portion 124 from which a pressure inlet 102 is formed. Carrier portion 124 and carrier portion 122 together can form a single carrier that surrounds pressure inlet 102. System 100 can be implemented as an exhaust back pressure sensor.

A sensor 116 can be configured generally above pressure inlet 102, as indicated by arrow 105. Sensor 116 generally includes a hermetically sealed glass cover 114 for absolute pressure reference and a backside reference pressure cavity 112 for absolute pressure sensor capabilities. One or more piezoresistors 110 can be located on micromachined silicon die 104 below the backside reference pressure cavity 112. Micromachined silicon die 104 can function as absolute pressure sensor die. A diaphragm 106 can be formed from micromachined silicon die such that piezoresistor(s) 110 is incorporated into diaphragm 106. Additionally, one or more wire bond pads, such as wire bond pad 108 can be provided, which link the micromachined silicon die 104 to circuit board 120.

The core technology of such an exhaust back pressure sensor system is the absolute pressure sensor die (i.e., Micromachined silicon die 104). The sense or sensor die 104 can be micromachined from silicon. The die 104 can be, for example, approximately 2.7 mm long, 2.2 mm wide, and 0.39 mm thick. The die 104 can be configured to include a sense cavity (e.g., backside reference pressure cavity 112) that is, for example, approximately 1.3 mm square at the base of the die 104. A conventional silicon etching process can form the cavity angle of cavity 112. The resulting thickness of diaphragm 106 can be, for example, approximately 20 to 50 microns for a 4 bar full scale absolute pressure sensor, depending of course, upon design considerations. The sensor die can also be configured to incorporate a Wheatstone bridge circuit configuration, referred to simply as a "Wheatstone bridge".

One or more piezoresistors (e.g., 4 piezoresistors) such as piezoresistor 110 can be embedded in diaphragm 106 at locations that maximize the output of the sensor's Wheatstone bridge (not shown in FIG. 1). A diode can be created as a die temperature reference device. Conductive traces can be embedded in the die 104 to connect the piezoresistors in a full Wheatstone bridge configuration and to connect the bridge corners and the diode to, for example, six wire bond pads at one of the long edges of the die. Four of the six wire bond pads, for example, can be attached to the four corners of the Wheatstone bridge. At least two of the wire bond pads can be attached to the diode. The P diode connection pad may be connected to one of the Wheatstone bridge outputs (voltage supply) to eliminate a wire bond. The wire bonds can then be metalized. The glass cover 114 can then be attached by anodic bond to the top surface of the silicon die 104, thereby entrapping a reference volume of gas.

Figure 2:
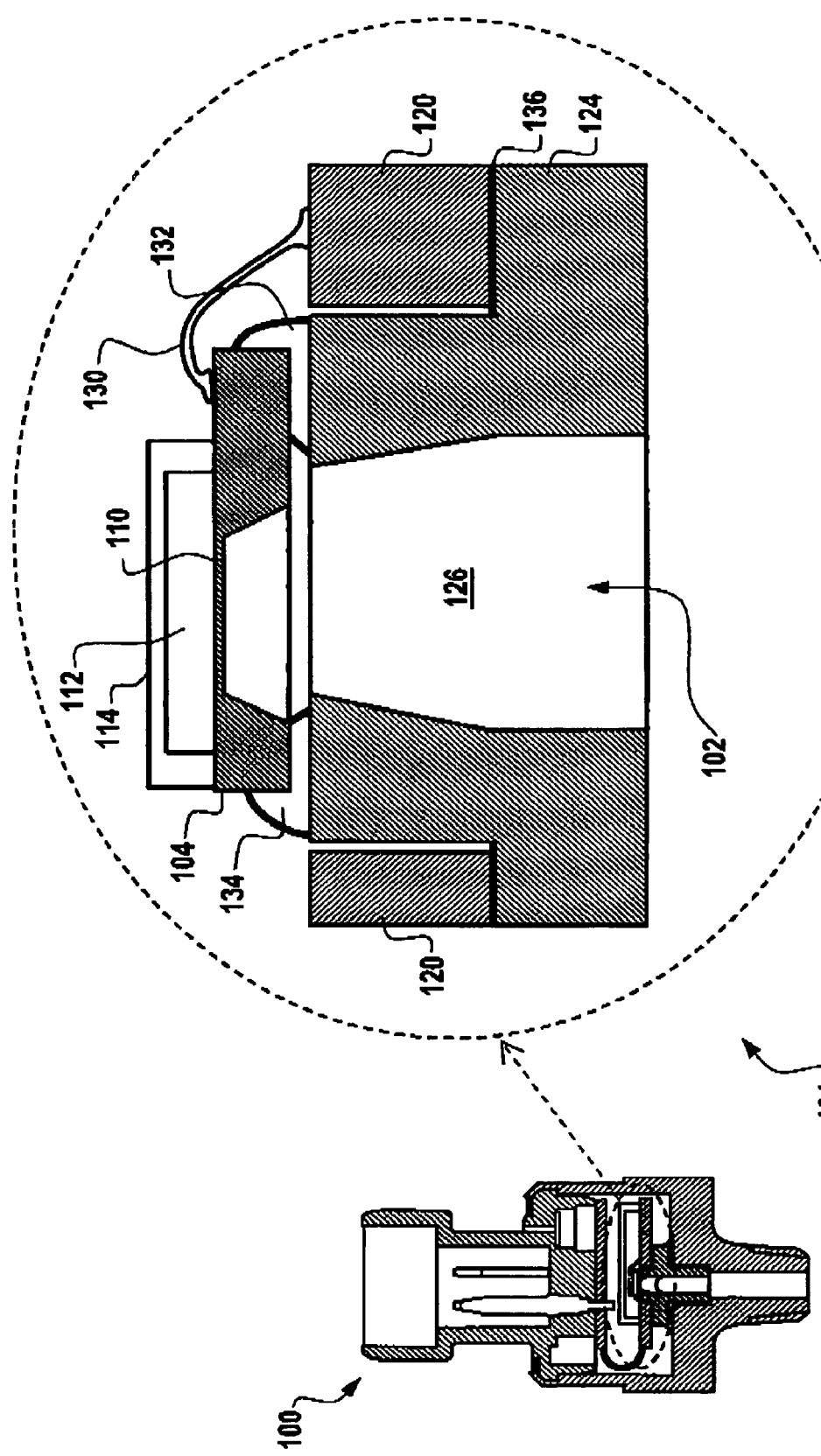
FIG. 2 illustrates additional features of the system depicted in FIG. 1, including a sense die mechanical/electrical interface thereof, in accordance with a preferred embodiment.

FIG. 2 illustrates additional features of system 100 of FIG. 1, including the sense die mechanical/electrical interface of system 100, which can be implemented in accordance with a preferred embodiment. System 100 is generally configured so that the absolute sense die 104 with hermetic glass cover 114 can then be attached to a plastic carrier (e.g., carrier portions 124 and 122) using, for example, a silicone adhesive 132. The adhesive 132 can be cured. A protective fluorsilicone gel 126 can be inserted into the carrier's hole under vacuum in order to protect the silicone adhesive 132 and the diaphragm 106 of the silicon sense die 104.

Figure 5:
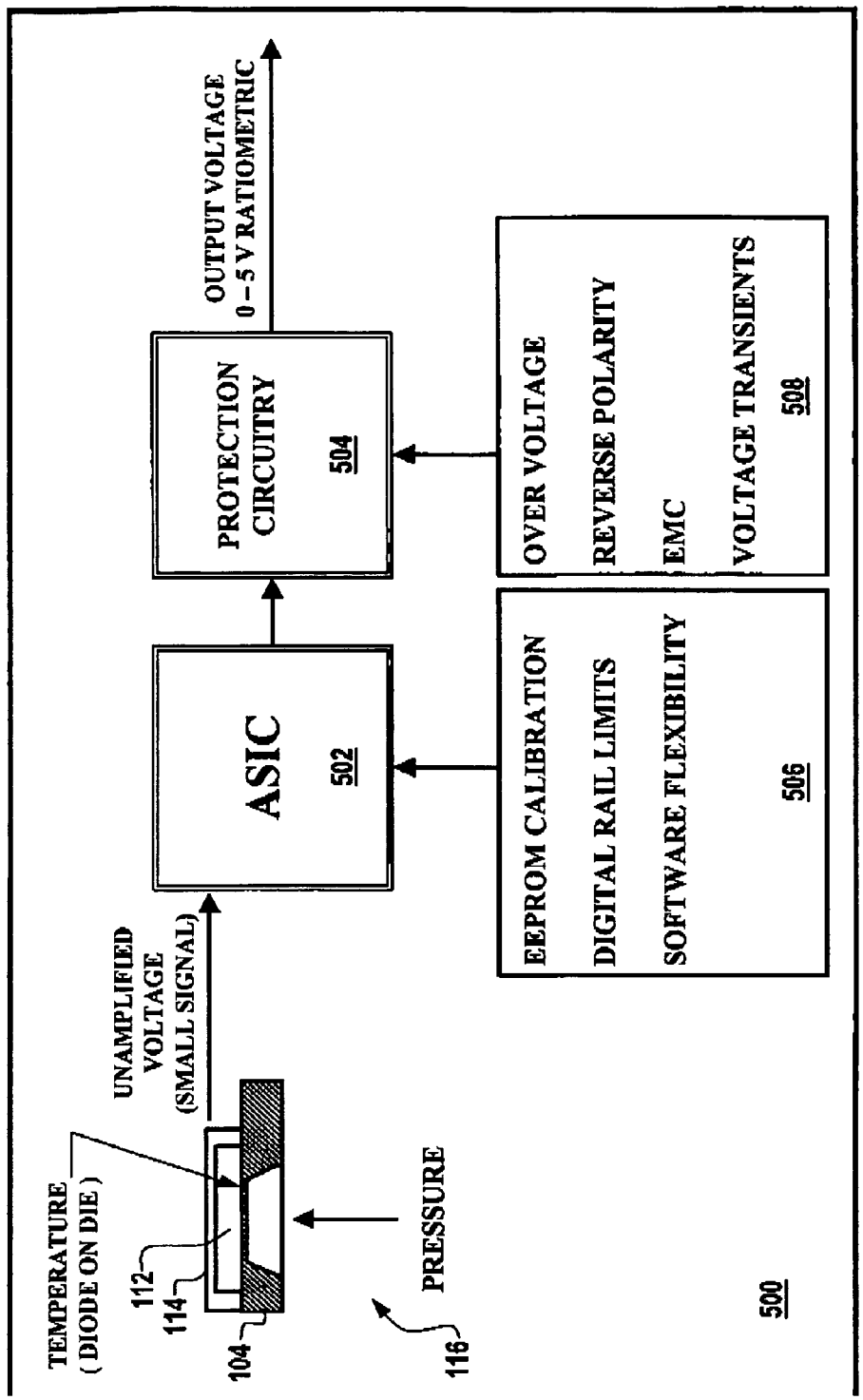
FIG. 5 illustrates a high-level block diagram of a system, which can be implemented in accordance with a preferred embodiment.

Circuit board 120 can be implemented as a flexible PCB (Printed Circuit Board) having two stiffened lobes populated using standard surface mount components and techniques. The surface mount components can be utilized to provide electromagnetic interference and electrostatic discharge protection for the circuit. Circuit board 120 can then be coupled to the carrier assembly formed from carrier portions 122, 124 using an epoxy adhesive 136. The adhesive can then be cured. An application specific integrate circuit (ASIC) can then adhesively be connected to the circuit board 120 on the same lobe as the hole for the silicon sense die 104. An example of such an ASIC is shown in FIG. 5 as ASIC 502. The ASIC adhesive can then be cured. The wire bond pads 108 of the sense die 104 and the ASIC generally face the same direction. The ASIC and the sense die 104 can then be connected to the printed circuit board 120 using aluminum and/or gold wire bonds 130. A plastic cover can be installed over the ASIC and the sense die 104 using an adhesive in order to protect the wire bonds 130 from being subjected to damage during additionally assembly steps.

The printed circuit board 120 assembly can then be connected to pressure and electrical connections at several temperatures in order to calibrate the ASIC. At each temperature the uncalibrated output of the sensor system 100 can be verified at two different pressures within the standard output pressure range of the sensor system 100. The ASIC can then be calibrated using EEPROM trim techniques so that it has the expected output offset and span/slope characteristics at the temperature. Note that as utilized herein, the acronym EEPROM refers generally to Electrically Erasable Programmable Read-Only Memory, which is a user-modifiable read-only memory (ROM) that can be erased and reprogrammed (i.e., written to) repeatedly through the application of higher than normal electrical voltage.

The correction values at each temperature of calibration can be recorded utilizing a computer. A calculation can then be utilized to fabricate a multi-order equation that corrects the sensor's output over temperature. The coefficients for that equation can be loaded into the unit's EEPROM after the final calibration temperature data is taken. After the correction equation coefficients are loaded into the unit's EEPROM, it is fully calibrated. An example of such an EEPROM capability is illustrated herein with respect to FIG. 5 (i.e., see EEPROM calibration 506 of FIG. 5).

Figure 3:
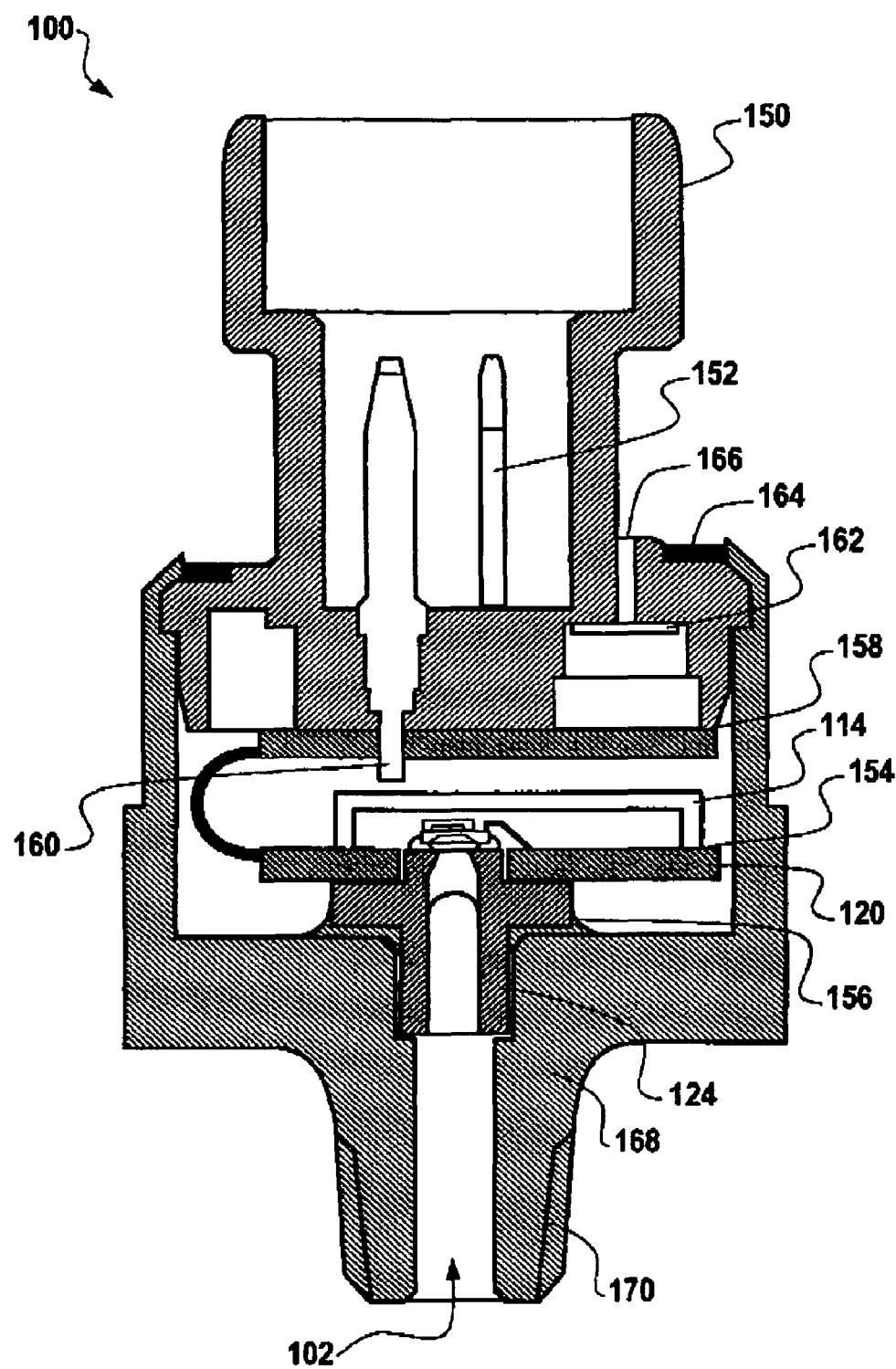
FIG. 3 illustrates a general packaging configuration for the system depicted in FIGS. 1–2, in accordance with a preferred embodiment.

FIG. 3 illustrates a general packaging configuration for the system 100 depicted in FIGS. 1–2, in accordance with a preferred embodiment. In general, one or more tin or gold plated brass terminals 152 can be inserted into a plastic connector 150. For example, three tin or gold plated brass terminals can be inserted into the plastic connector 150 (e.g., a current connector). A terminal 160 may also be provided, which passes through a section 148. A patch 162 formed from a thin, porous membrane such as Gore-Tex®, for example, can be crimped into a pocket in the plastic connector 150. It can be appreciated that the use of Gore-Tex®, for example, is not a limiting feature of the invention described herein, but is presented for exemplary and illustrative purposes only. Other porous membranes or porous materials can be implemented in accordance with embodiments disclosed herein. The pocket leads to a vent hole 166 in the plastic connector 150, so that the electronics may be vented during assembly through the vent patch 162. The printed circuit board 120 includes a surface 154 that is connected to the hermetically sealed glass cover 114. The three terminals of the connector 150 assembly, for example, can then be soldered to an output lobe of the printed circuit board 120.

Figure 4:
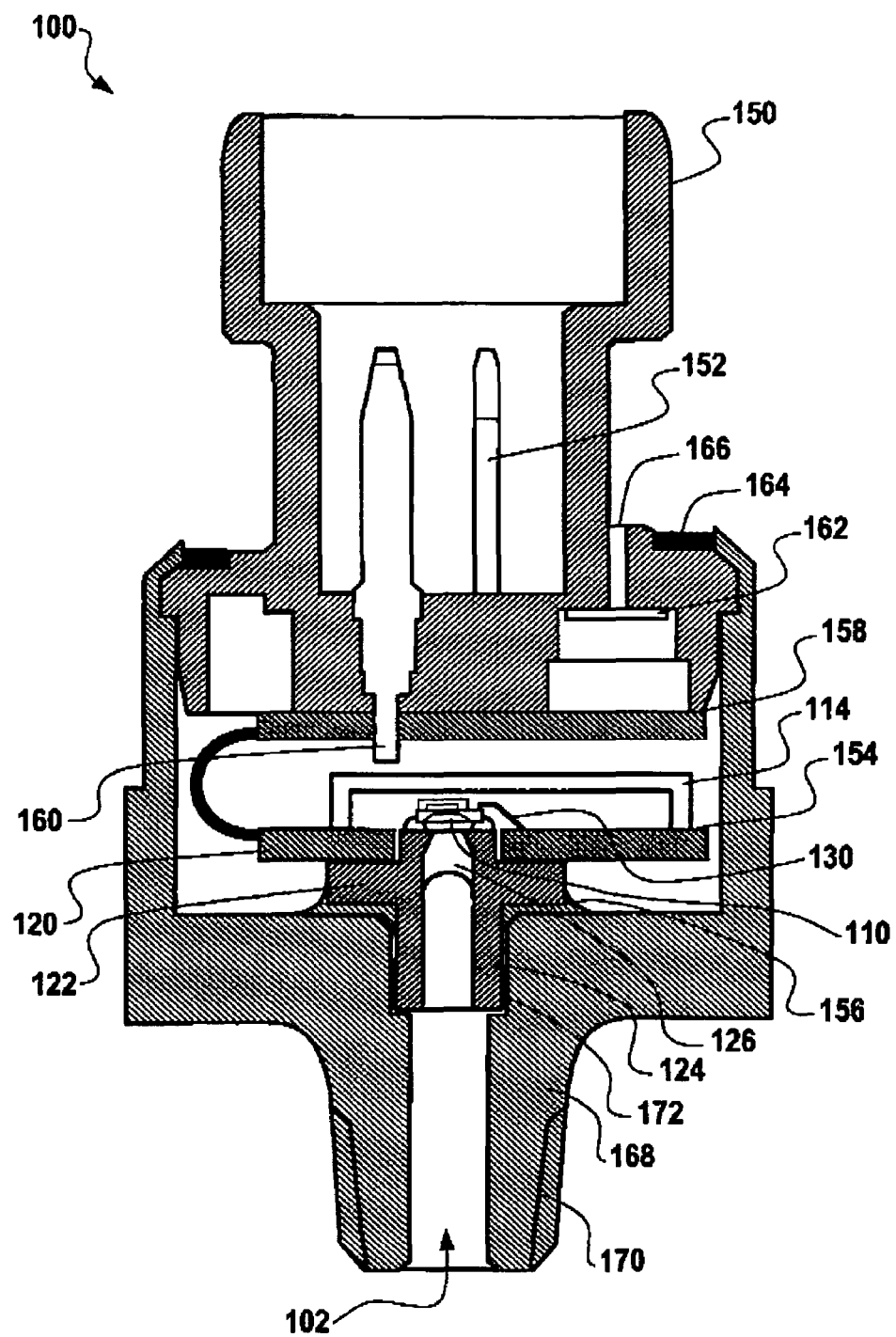
FIG. 4 illustrates an over-all exhaust back pressure sensor configuration for the system depicted in FIGS. 1–3, in accordance with a preferred embodiment.

FIG. 4 illustrates an over-all exhaust back pressure sensor configuration for system 100 depicted in FIGS. 1–3, in accordance with a preferred embodiment. A silicone sealant 156 can be inserted onto the base ledge of a housing 168, which can be configured to incorporate a pressure fitting 170. The housing 168 can be fabricated from aluminum, but may be implemented as brass or another material, depending upon design considerations. The printed circuit board 120 assembly, which includes the soldered connector 150 and the attached carrier formed by carrier portions 122, 124 with sense die 104 can then be inserted into the housing 168 having a surface 172. A sponge can be inserted between the two folded circuit lobes to prevent shorting and add height to the overall assembly of sensor 100. Printed circuit board 120 can be configured as a 2-lobe flexible circuit board with stiffeners, an ASIC and electrical components thereof.

The additional height allows the carrier formed by carrier portions 122, 124 to mate properly with the hole in the housing 168. The base of the carrier formed by carrier portions 122, 124 generally touches a dispensed adhesive 156 in the housing 168. Such a carrier base can rest on a gap feature in the housing 168 that sets the adhesive height at, for example, approximately 0.5 mm. This 0.5 mm gap can create stress isolation between the housing 168 and the sense die carrier (i.e., carrier portions 122, 124). The connector 150 possesses an edge that rests on a mating edge in the housing 168. The carrier-to-housing adhesive 156 can then be cured.

The housing 168 can be crimped around the connector 150, thereby locking the connector 150 in place vertically. The housing 168 crimp also prevents rotation. A sealant 164 can then be installed around the top of the crimp to seal the connector 150 to the housing 168 and provide additional anti-rotation support. That sealant can then be cured.

The sensors can be pressured beyond twice their full scale pressure to ensure adhesive integrity. The sensors can then be final-tested to ensure that they possess the proper output when pressure is connected. The units can then be bar-coded and/or labeled for identification and tracking purposes.

As explained previously, many conventional micromachined absolute pressure sensors function by mounting the material removal side of the silicon sense die into glass. Such a methodology can create a conventional absolute sensor. The problem with this geometric relationship is that the wire bond pads and active regions of the sense die end up facing the sensed media. Exhaust gas contains acids and other chemicals that can penetrate protective gels over time and attack the sense die and its wire bonds.

The embodiments described herein, solve this problem by implementing an absolute sense die concept that creates a necessary reference cavity by hermetically sealing glass or another appropriate material to the backside of the sense die. This arrangement creates a geometry wherein the electrically sensitive portions of the sense die are not exposed to the sensed media. Additionally, protective gel can be inserted into the sensed media side of the pressure sensor. Such a gel can provide an additional layer of protection for both the sense die and the adhesives that attach the sense die to the carrier.

FIG. 5 illustrates a high-level block diagram of a system 500, which can be implemented in accordance with an alternative embodiment. System 500 generally incorporates an ASIC 502 connected to protection circuitry 504. An unamplified small voltage signal can be provided to ASIC 502 from sensor 116. Additionally, EEPROM calibration data can be provided by EEPROM calibration as indicated at block 506, including digital rail limits and software flexibility. Over voltage, reverse polarity, EMC and voltage transient features can be provided to protection circuitry 504, as indicated by block 508 of FIG. 5.

ASIC 502 depicted in FIG. 5 generally converts Wheatstone resistance delta data in to output voltage and corrects the output digitally by an internal $2^{nd}$ order curve fitting equation. The equation coefficients can be calculated and programmed during EEPROM calibration as indicated by block 506. Temperature can be determined by a diode located on sense die 104. A signal path from die 104 to the output of sensor 116 is generally analog-digital-analog for isolation and compensation flexibility.

The second embodiment relates to an absolute and differential pressure sensor with isolation between the sensor's electronics and the sensed media. The sensor's electronic circuitry can incorporate a specific integrated circuit (ASIC) that processes and outputs the signal for both absolute and differential measurements. Such a sensor can be utilized for exhaust gas recirculation (EGR) systems on automotive gasoline engines.

The embodiment of FIG. 5 is based upon the use of absolute pressure sense die 104. The sense die 104 can be configured via micromachined silicon with piezoresistors in a Wheatstone bridge configuration and a topside glass cap. Wire bond pads on the topside allow for electrical connection to the Wheatstone bridge. The sense die 104 can be mounted to a plastic carrier using, for example, a silicone adhesive. The adhesive can be cured and the assembly can be leak checked.

Two sense die/carrier assemblies can be attached to a printed circuit board (PCB) using an epoxy adhesive. The epoxy can be cured and the sense dies can be gold ball wire bonded to the PCB. The PCB can incorporate ASIC 504, 502, along with over-voltage and reverse polarity protection circuitry, EMC protection circuitry as indicated by block 508 and output protection circuitry 504. A steel EMI shield, for example, can be crimped onto the PCB to protect the wire bonds from damage and also provide EMI protection. Such an assembly can be referred to as the "Board Assembly".

The Board Assembly can be calibrated by applying various pressures at various temperatures and measuring the sense die response via the ASIC 502. Coefficients for a correction function can be calculated and programmed into EEPROM locations in the ASIC 502. During calibration, software can be utilized to control desired output transfer functions, diagnostic limits, output modes, time response, and resolution, which are indicated by block 506 in FIG. 5.

The calibrated Board Assembly can then be attached to a housing using silicone sealant on the bottom of the carriers and soldering terminals to the PCB. The silicone sealant can then be cured. A lid can be pressed into the housing and sealed with a silicone adhesive. The silicone adhesive can then be cured. A vent hole on the lid can be sealed with an epoxy and cured. Such an assembly can be referred to as the "Final Assembly". The Final Assembly can then be final-tested to ensure proper output. The Final Assembly can then be labeled for identification and tracking purposes.

The ASIC 502 is a key aspect of the aforementioned second embodiment. The ASIC 502 can allow for two sense dies to be digitally calibrated with temperature compensation. An advantage of such a configuration is that the ASIC 502 permits the ability to control output modes via software during calibration. Possible output modes are Pressure 1, Pressure 2, Temperature 1, Temperature 2 Differential Pressure and Flow. Whereas conventional sensor configurations must be re-designed to change from a DP/MAP output configuration to MAP/MAP configuration, the ASIC 504502 allows for this change to occur in-process. Note that the acronym DP represents differential pressure, while the acronym MAP represents manifold absolute pressure. Thus, DP/MAP represents differential pressure/manifold absolute pressure.

ASIC 502 can be powered, for example, by a 5 DC voltage source and output two 0.100 DC to 4.900 DC voltage ratio metric analog signals. An internal current source can drive each sense die with approximately 1 mA of constant current excitation. A multiplexer switches the excitation while measuring the pressure and temperature signal of the each Wheatstone bridge thereof. The pressure signal can be measured by reading the differential voltage across the powered Wheatstone bridge. The temperature signal can be measured by reading the bridge resistance of the sense die. The input signals can be conditioned utilizing a chopper pre-amplifier stage.

The amplified signals can then be converted to digital values via, for example, a 13-bit Analog-to-Digital Converter (ADC). Such values can then be used along with coefficients from the EEPROM in a second-order curve fit function. The mathematical result can then be passed through a digital averaging filter and compared against diagnostic limitations. The final value can be converted to an analog voltage via an 11-bit Digital-to-Analog converter (DAC). A second order low-pass filter controlled by internal resistors and external capacitors can provide another means of controlling time response of the output signal.

As indicated earlier, many conventional micromachined absolute pressure sensors function by mounting the material removal side of the silicon sense die onto glass. The opposite side of the sensor, which contains the wire bond pads and active regions, can be directed toward the sensed media. Various chemicals and environmental elements can corrode and break down the sense die and wire bonds. The embodiment disclosed herein therefore solves these problems by creating the necessary reference cavity by hermetically sealing glass to the active side of the sense die. The passive side of the sense die can be directed towards the sensed media, isolating all of the sensor electronics.

Such an embodiment can also provide improved measurement accuracies over conventional sensor configurations, along with improved resolution and speed. The sensor circuit incorporates an ASIC, as indicated above, which can process pressure and temperature signals from one or more absolute sense dies, but preferably, at least two absolute sensor or sense dies. The signals can be converted into the digital realm where calibration functions are implemented to achieve the desired absolute and differential pressure values. Conversion back to analog can provide a final output signal.

Figure 6:
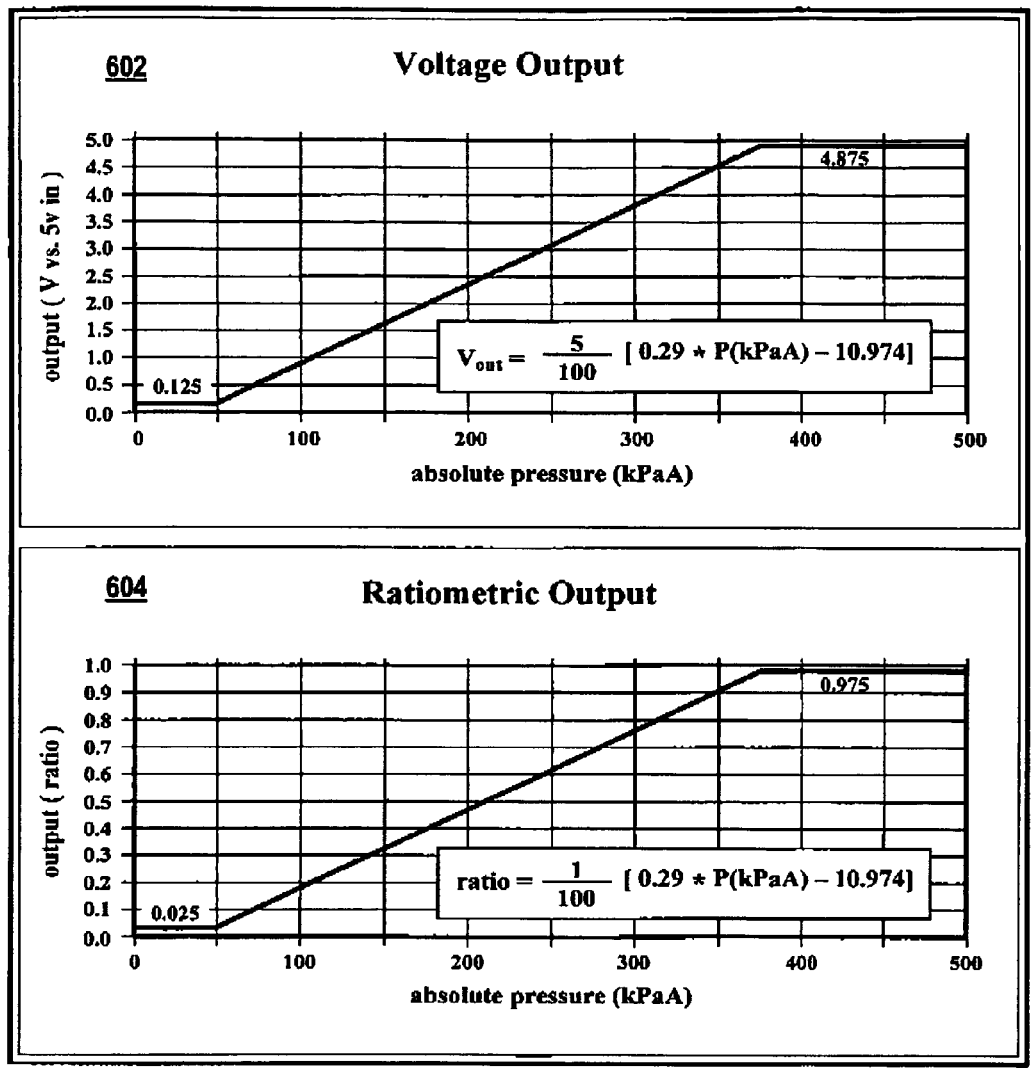
FIG. 6 illustrates graphs depicting voltage output and ratio metric outputs in accordance with one embodiment.

FIG. 6 illustrates graphs 602 and 604 depicting voltage output and ratio metric outputs in accordance with one embodiment. Graph 602 indicates voltage output, while graph 604 depicts ratio metric output. Graph 602 tracks voltage output versus absolute pressure in kPaA. Graph 604, on the other hand tracks voltage output ratios versus absolute pressure in kPaA. Graphs 602 and 604 indicate that sensor output may be adjusted in either Span (Slope) or Offset. The upper clamping rail is adjustable from 95% to 97.5%. Additionally, a lower clamping rail is adjustable from 2.5% to 5%. The graphs 602 and 604 are depicted with a lower clamping rail of 2.5% and an upper clamping rail of 97.5%.

Figure 7:
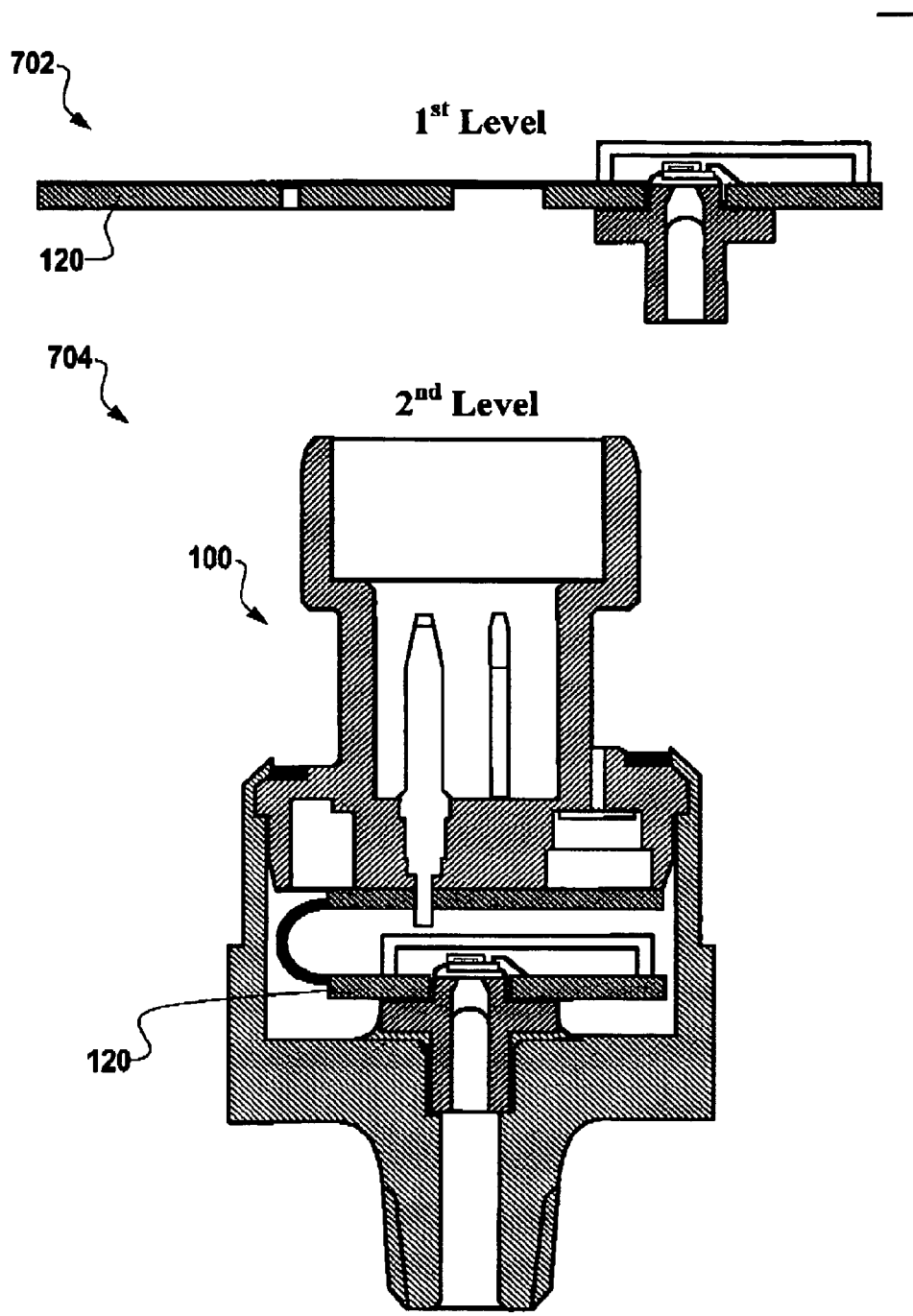
FIG. 7 illustrates a first level assembly and a second level assembly of the absolute pressure sensor system depicted in FIGS. 1–5, in accordance with an alternative embodiment.

FIG. 7 illustrates a first level assembly 702 and a second level assembly 704 of the absolute pressure sensor system 100 depicted in FIGS. 1–5, in accordance with an alternative embodiment. Note that in FIGS. 1–7, identical or similar parts or elements are generally indicated by identical reference numerals. The first level assembly 702 configuration provides a fully functional sub-assembly for flexibility. Calibration (e.g., see block 506 of FIG. 5) generally occurs at the first level assembly 702. The second level assembly 704 generally features that isolate housing and connector stresses from the calibrated 1$^{st}$ level assembly.

Figure 8:
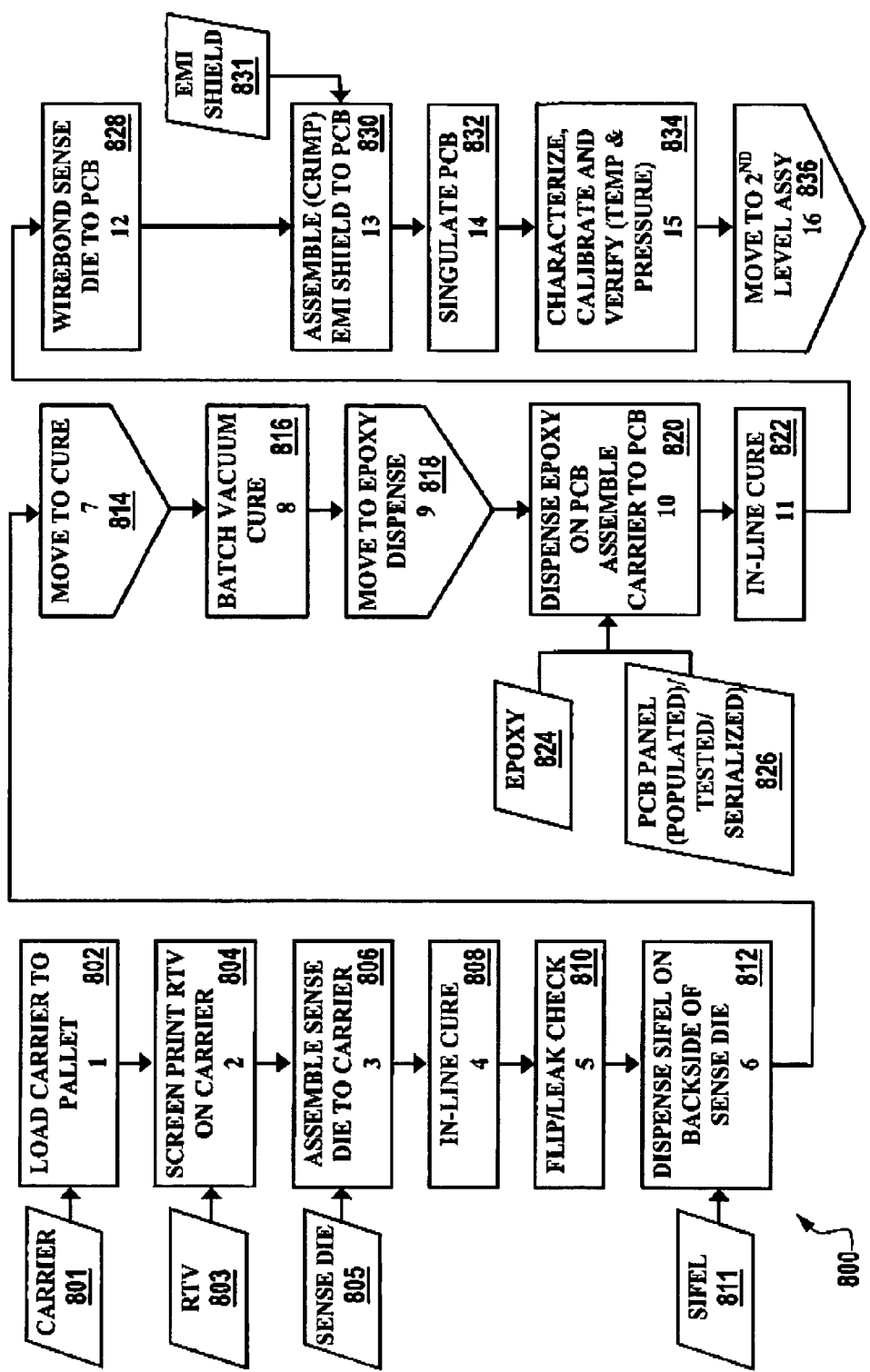
FIG. 8 illustrates a high-level flow chart of a first level assembly flow sequence, which can be implemented in accordance with one embodiment of the present invention.

FIG. 8 illustrates a high-level flow chart 800 of a first level assembly flow sequence, which can be implemented in accordance with one embodiment of the present invention. A carrier such as a carrier formed from carrier portions 122, 124 can be loaded to a pallet, as indicated at blocks 801 and 802. An RTV silicone sealant can be screen printed on the carrier as indicated at block 803 and 804. Sense die (e.g., sense die 104) can be assembled to the carrier as depicted in block 805 and 806. Thereafter, as indicated at block 808, in-line cure processes can be implemented upon the devices assembled according to prior blocks 801, 802, 803, 804, 805 and 806.

Next, as indicated at block 810, a flip/leak check operation can be implemented, followed by dispensing of a Sifel gel material on the back side of the sense die (e.g., backside of sense die 104). The assembled components can then be moved for curing, as indicated at block 814, followed by an actual batch vacuum cure, as indicated at block 816. Thereafter, as indicated at block 818, the assembly can be moved for epoxy dispensing. Thereafter, as indicated at blocks 824, 826 and 820, an epoxy and a populated, tested, serialized PCB (e.g., circuit board 120) can be configured such that the epoxy is dispensed on the PCB followed by assembly of the carrier (e.g., carrier portions 122, 124) to the PCB (e.g., circuit board 120).

An in-line cure operation can then be implemented, as indicated at block 822, followed by connecting the wire bond sense die to the PCB, as depicted at block 828. Thereafter, as indicated at blocks 831 and 830, an EMI shield can be assembled (e.g., crimped) to the PCB. Next, as indicated at block 832, the PCB can undergo a singulate operation. Thereafter, as depicted at block 834, characterization, calibration and temperature and pressure verification operations can be performed. Finally, as indicated at block 836, the $2^{nd}$ level assembly can be initiated, the process of which is described in greater detail in FIG. 9.

Figure 9:
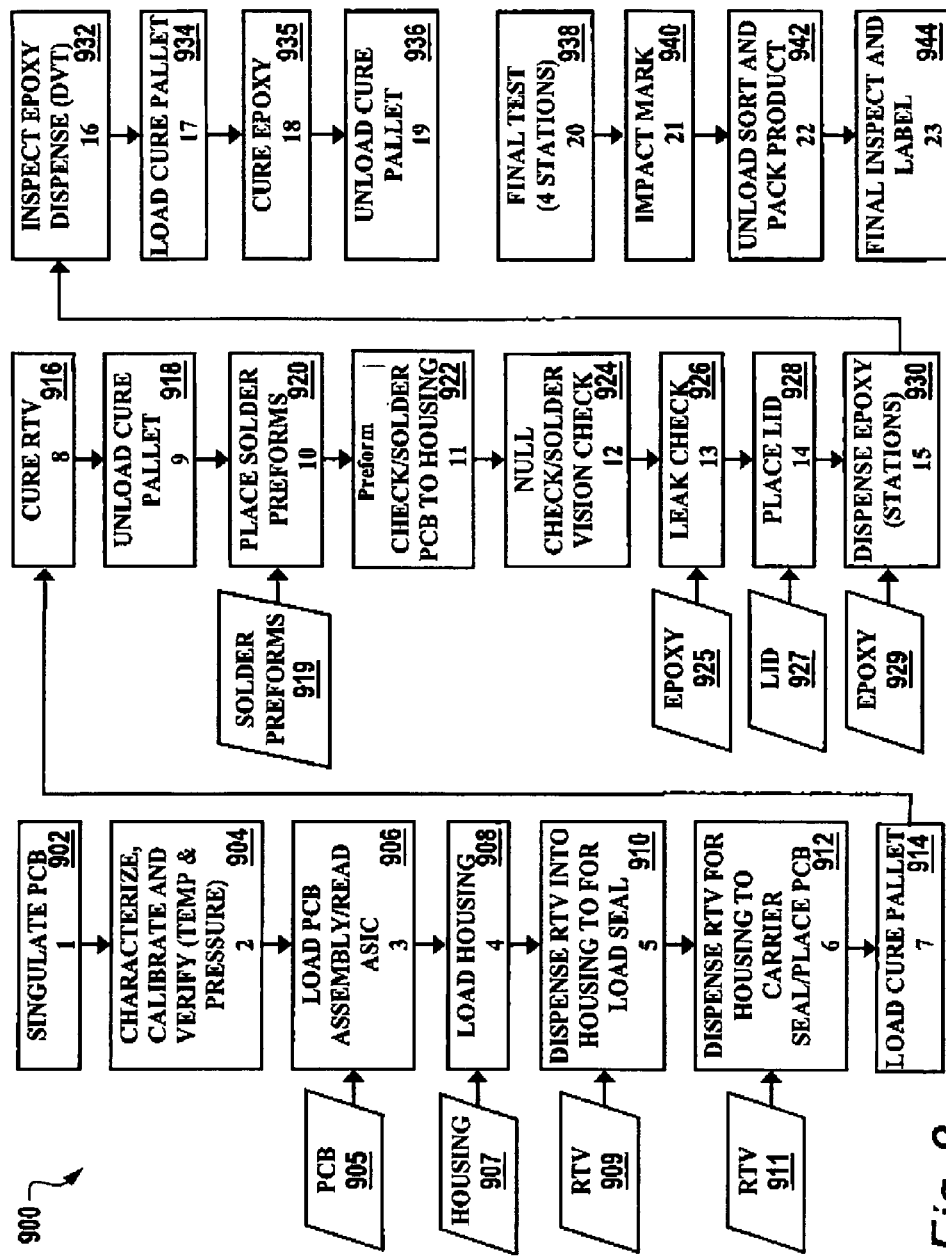
FIG. 9 illustrates a high-level flow chart of a second level assembly flow sequence, which can be implemented in accordance with another embodiment of the present invention.

FIG. 9 illustrates a high-level flow chart 900 of a second level assembly flow sequence, which can be implemented in accordance with another embodiment of the present invention. Flow chart 900 represents a continuation of the operations depicted in FIG. 8. As indicated at block 902, the PCB (e.g., circuit board 120) can be subjected to a singulate operation. Thereafter, as depicted at block 904, the assembly can be characterized, calibrated and verified with respect to temperature and pressure sensing. Next, as depicted at blocks 905 and 906, the PCB assembly can be loaded and the ASIC read. Next, as depicted at blocks 907 and 908, the housing (e.g., housing 168) can be loaded.

Thereafter, as indicated at blocks 909 and 910, an RTV sealant can be dispensed into the housing for load sealing thereof. Next, as indicated at blocks 911 and 912, an RTV sealant can be dispensed for a housing-to-carrier seal and for placing the PCB into the second level assembly. Next, as depicted at block 914, a load cure pallet operation can be implemented. Thereafter, as depicted at block 916, the RTV sealant or adhesive can be cured. Thereafter, an unload cure pallet operation can be implemented, as indicated at block 918, followed by an operation in which solder performs are placed into the second level assembly, as depicted at blocks 919 and 920.

Thereafter, as indicated at block 922, the preform solder can be checked and used to solder the PCB (e.g., circuit board 120) to the housing (e.g., housing 168). Following the operation depicted at block 924, a null check/solder vision check operation can be implemented, followed thereafter by an epoxy and leak check, as depicted at blocks 925 and 926. Next, as depicted at blocks 927 and 928, a lid may be located in place in the second level assembly, followed by an operation in which epoxy is dispensed at particular assembly stations, as indicated by blocks 929 and 930.

Thereafter, the epoxy can be dispensed and inspected, as depicted at block 932, followed by a load cure pallet operation, as indicated by block 934. Next, as indicated at block 935 an epoxy cure operation can be implemented, followed by an unload cure pallet operation, as depicted at block 936. Thereafter, as depicted at block 938, a final test can be performed using four assembly stations, followed by an impact mark operation, as indicated at block 940. Next, as indicated at block 942, the second level assembly can be unloaded, sorted and packed into the final product. Finally, as indicated at block 944, the final product implementing system 100 can be inspected and labeled.

Figure 10:
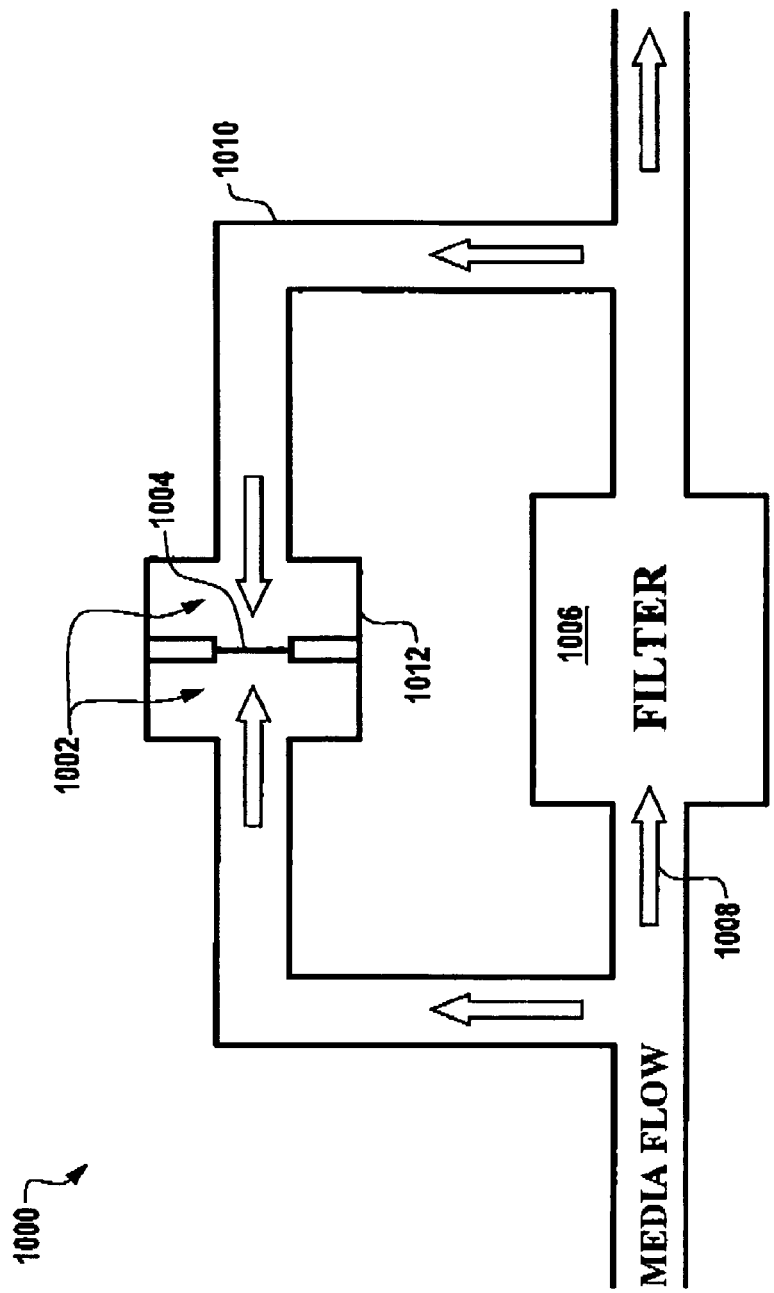
FIG. 10 illustrates a conventional pressure sensing system that utilizes one die to sense differential pressure across two sides of the die.

FIG. 10 illustrates a conventional pressure sensing system 1000 that utilizes one die 1004 to sense differential pressure across two sides of the die 1004. System 1000 is configured such that the sense die 1004 detects sensed media 1002. Media flow is indicated by arrows, such as arrow 1008. A filter 1006 functions to filter media and is located opposite a containment 1012 in which sense die 1004 is located. In the conventional system 1000, the differential pressure is transmitted to a control module for controlling and/or monitoring purposes. The problem with such a design is that the wire bonds and active regions of the sense die 1004 end up facing the sensed media 1002. Because the sensed media 1002 contains acids and other chemicals, the active regions and the wire bonds can be attacked by such chemicals, causing the sense die 1004 to fail.

Figure 11:
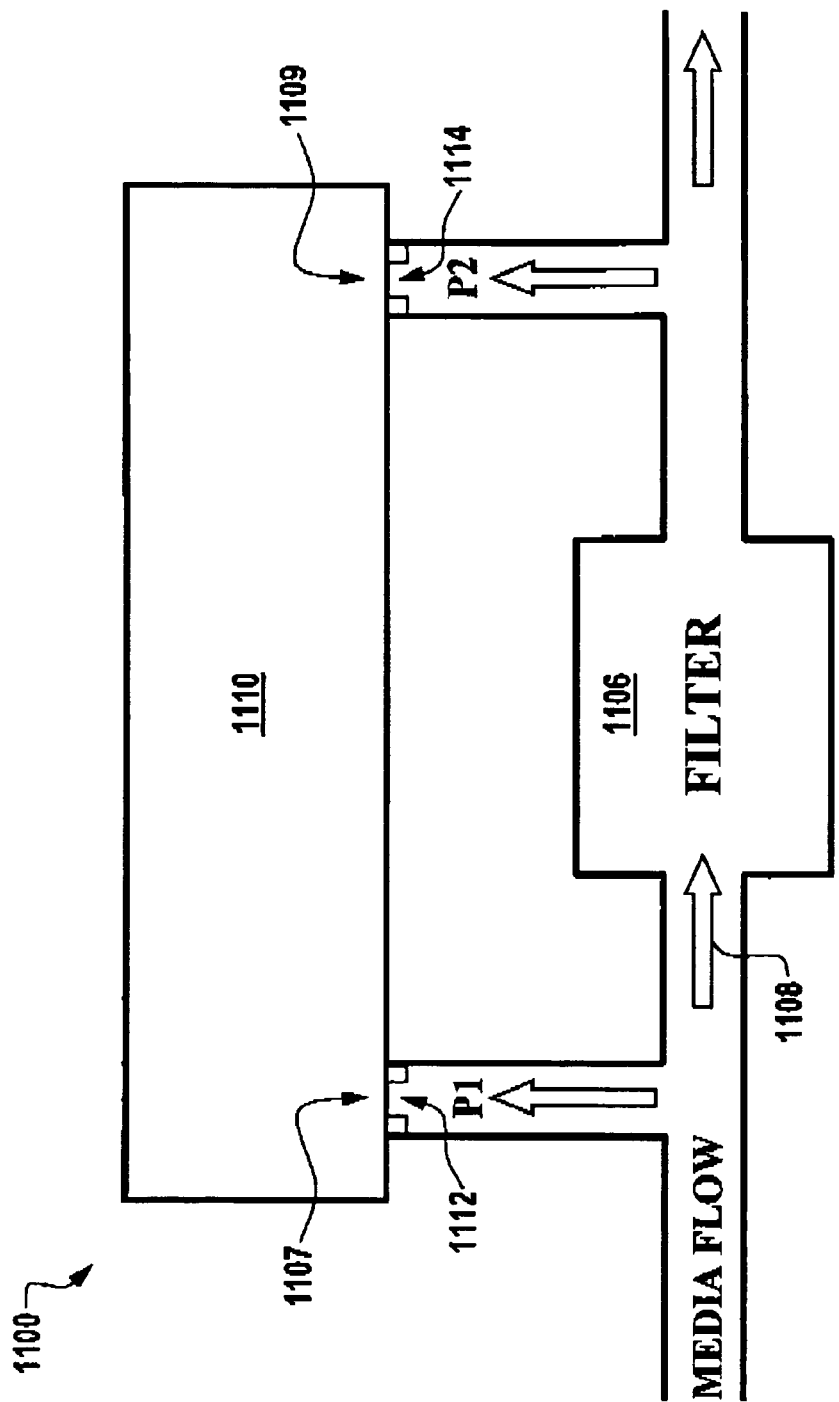
FIG. 11 illustrates an improved pressure sensing system for measuring differential pressure in accordance with an alternative embodiment.

FIG. 11 illustrates an improved pressure sensing system 1100 for measuring differential pressure in accordance with an alternative embodiment. The alternative embodiment of system 1000 solves the problems associated with system 1100 of FIG. 10 by implementing two separate dies 1107, 1109, one for each pressure P1 and P2, thereby creating a geometry wherein the sensed media is applied only at the backside of the sense dies 1107, 1109. Therefore, the wire bonds and the active regions on one side of the sense die 1107, 1109 are not exposed to the sensed media and thus, are not subjected to acids and/or chemical attack. The sensed media is not present on side 1110 of the die. The backside of the dies or the sensing dies, through exposure to the sensed media, can be coated with a layer of protective gel 1112, 1114. Media flow is indicated in FIG. 11 generally by arrows such as arrow 1108. The media may flow through a filter 1106.

Because known acids and chemicals contained in the sensed media do not attack this gel 1112, 1114, this side of the die 1107, 1109 can also be protected from acids and chemical attacks. Products implemented via the third embodiment discussed herein sense pressure from the backside of two dies 1107, 1109. Associated circuitries can provide EMC protection, over-voltage and reverse polarity protection and other algorithms utilizing a single ASIC. Products based on conventional configurations, however, sense pressure on both sides of a single die.

Figure 12:
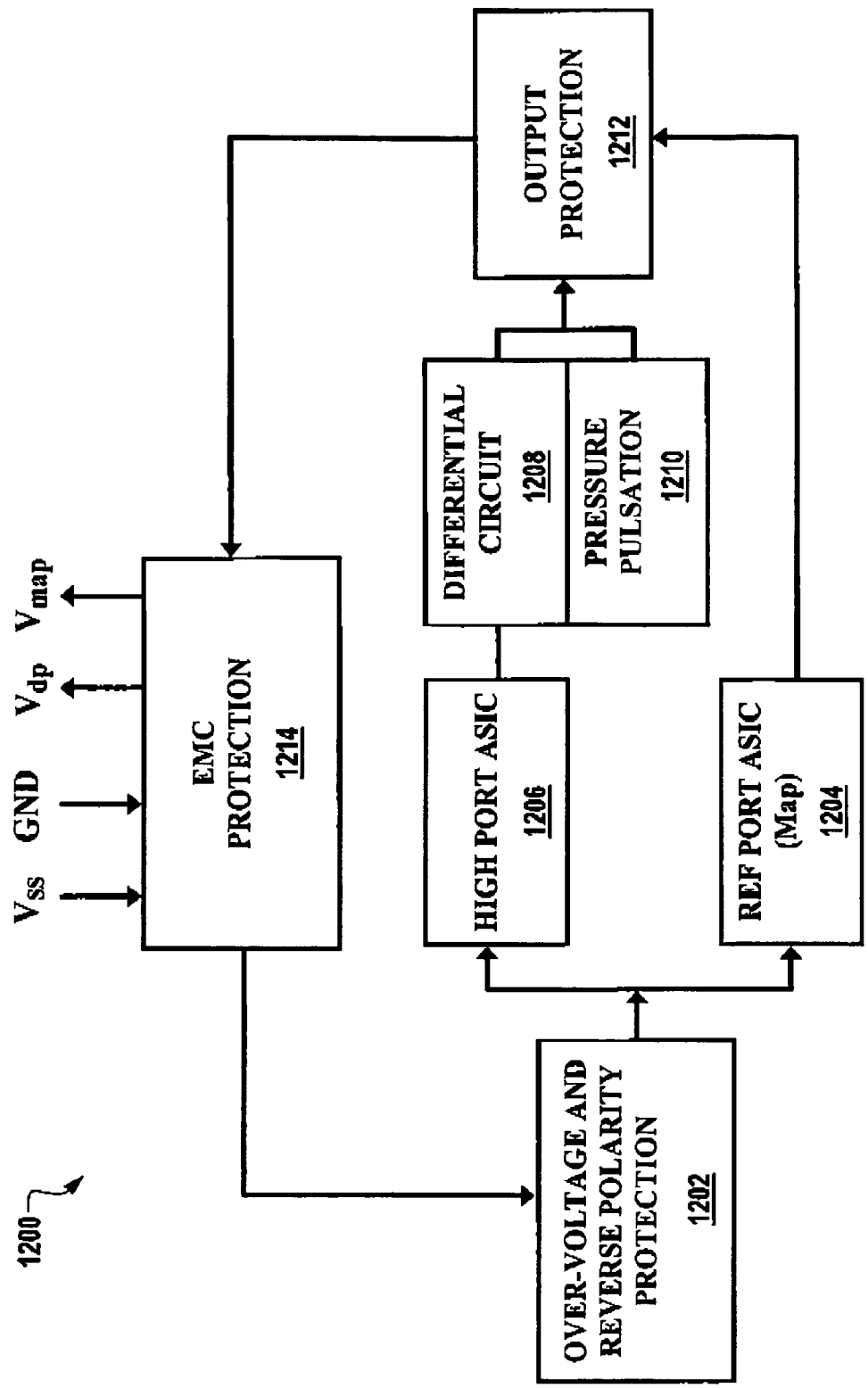
FIG. 12 illustrates a block diagram of a two-ASIC circuit system, which can be implemented in accordance with an alternative embodiment.

FIG. 12 illustrates a block diagram of a two-ASIC circuit system 1200, which can be implemented in accordance with an alternative embodiment. System 1200 generally includes an over-voltage and polarity protection circuit 1202 whose output is coupled to a high port ASIC 1206 and a reference port ASIC 1204. The Output from the high port ASIC 1206 can be coupled to a differential circuit 1208, which in turn is coupled to a pressure pulsation circuit 1210. Output from the differential circuit 1208 and the pressure pulsation circuit 1210 can be fed as input to an output protection circuit 1212. Output from the reference port ASIC 1204 can also be fed to the output protection circuit 1212. Output from the output protection circuit 1212 can in turn be fed to EMC protection circuitry 1214. Output from the EMC protection circuitry 1214 can in turn be fed back to the over-voltage and reverse polarity protection circuit 1202.

Figure 13:
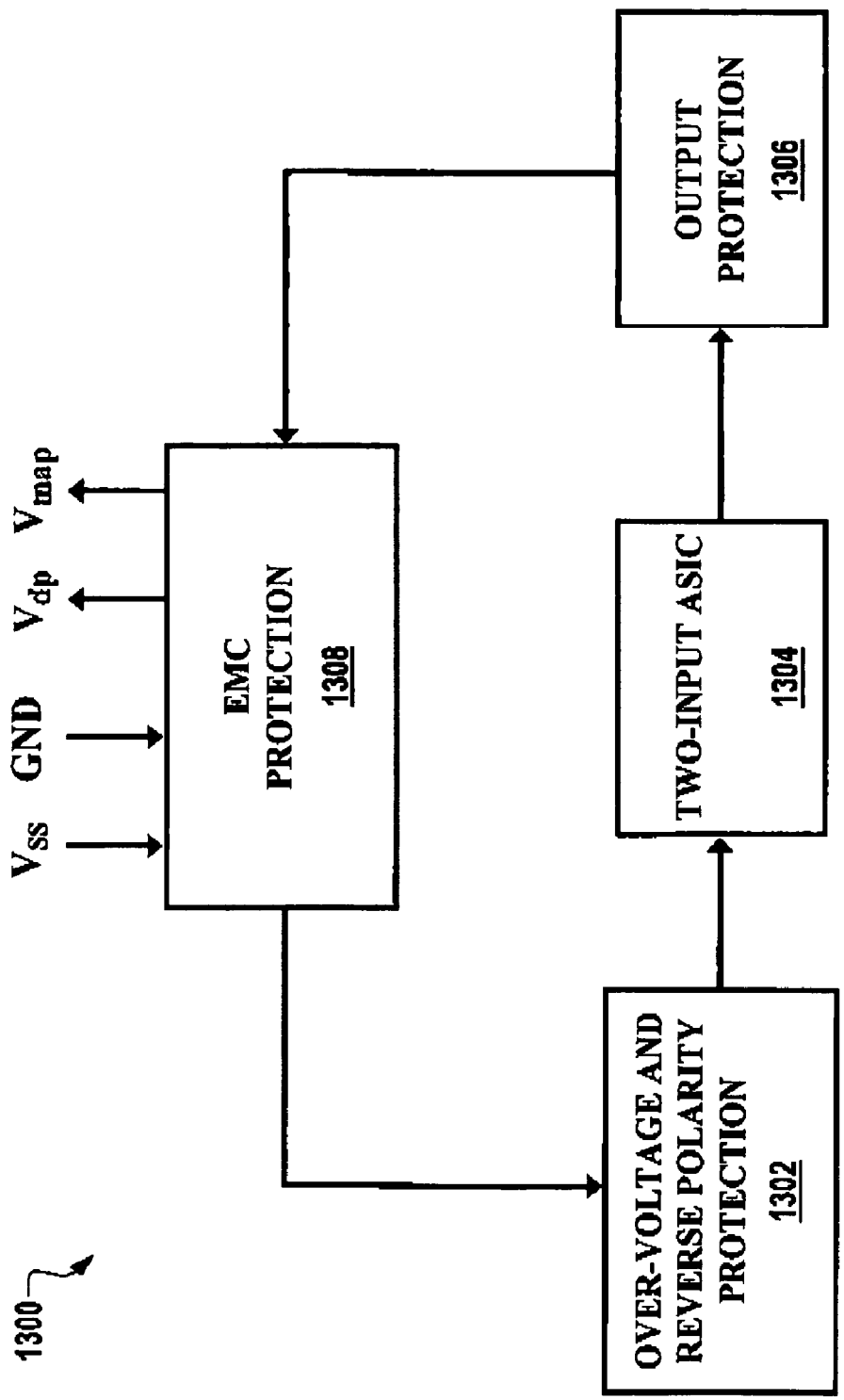
FIG. 13 illustrates a block diagram of a single-ASIC circuit system, which can be implemented in accordance with an alternative embodiment.

FIG. 13 illustrates a block diagram of a single-ASIC circuit system 1300, which can be implemented in accordance with an alternative embodiment. System 1300 generally includes an over-voltage and reverse polarity protection circuit 1302, whose output is coupled and fed as input to a two-input ASIC 1304. Output from the two-input ASIC 1304 is then fed to an output protection circuit 1306. An output signal from the output protection circuit 1306 can then be fed as input to EMC protection circuit 1308. Finally, output from the EMC protection circuit 1308 can be fed as input to the over-voltage and reverse polarity protection circuit 1302.

Because a need exists for measuring differential pressure across a diesel particulate filter and/or applications in which differential pressure is required for system control and/or monitoring purposes, the embodiments of FIGS. 10 and 12–13 can be utilized. Using backside sensing techniques and a single ASIC 1304, such an embodiment can be implemented as a pressure sensor for measuring the differential pressure across a diesel particulate filter, and/or applications in which differential pressure is used for system control and/or monitoring purposes.

Such an embodiment can transmit this differential pressure to a control module in the form of an analog output voltage signal. This output voltage signal is low when the filter 1106 is clean or the media flow is high. Over time, minute particles can build up in the filter 1106, thereby restricting the media flow. As the media flow decreases, differential pressure across the filter 1106 and the output voltage signal can increase. The engine control module can then use this output voltage signal, together with other parameters to determine whether or not the filter 1106 should be cleaned.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows. Having thus described the invention what is claimed is:

1. A differential pressure sensor system, comprising:
   an absolute pressure sensor comprising a plurality of pressure sense die for detecting sensed media, wherein each of said plurality of pressure sense die possesses a back side and a front side and are respectively associated with a plurality of varying pressures;
   wherein said sensed media are applied only at said backside of said plurality of pressure sense die, thereby preventing wire bonds and active regions associated with said front side of said plurality of pressure sense die from exposure to sensed media and attack from acids and abrasive chemicals associated with said sensed media;
   at least one ASIC for automatically calibrating said plurality of pressure sense die, wherein said at least one ASIC comprises a high port ASIC in association with a reference port ASIC;
   an over-voltage and reverse polarity protection circuit that provides data as input to said high port ASIC and said reference port ASIC;
   a differential circuit associated with a pressure pulsation circuit, wherein said differential circuit receives as input, data transmitted from said high port ASIC;
   an output protection circuit which receives as input, data output from said differential circuit and said pressure pulsation circuit; and
   an EMC protection circuit, which receives as input, data output from said output protection circuit, wherein said EMC protection circuit outputs data which is fed as input to said over-voltage and reverse polarity protection circuit.

2. The system of claim 1 wherein said plurality of pressure sense die and a hermetically sealed cover are located above a diaphragm configured from said plurality of pressure sense die, wherein said sealed cover and said diaphragm form a reference pressure cavity therebetween.

3. The system of claim 2 further comprising:
   a housing in which said absolute pressure sensor is located in association with a carrier for maintaining said absolute pressure sensor and a circuit board populated with a plurality of surface mounted components for electrical connection to said absolute pressure sensor; and
   a pressure inlet formed from said carrier, wherein said pressure inlet is filled with a gel for protecting said diaphragm and at least one adhesive thereof, thereby preventing an exhaust gas, including acids and hazardous chemicals thereof from damaging said at least one pressure sense die and electrically sensitive portions thereof.

4. The system of claim 3 wherein said gel comprises a fluorsilicone gel and said at least one adhesive comprises silicone.

5. The system of claim 3 further comprising a plurality of piezoresistors embedded in said diaphragm at locations that maximize an output of said absolute pressure sensor.

6. A differential pressure sensor system, comprising:
   an absolute pressure sensor that detects diesel particulate matter, wherein said absolute pressure sensor comprises a plurality of pressure sense die for detecting sensed media, wherein each of said plurality of pressure sense die possesses a back side and a front side and are respectively associated with a plurality of varying pressures;
   at least one ASIC for automatically calibrating said plurality of pressure sense die, wherein said sensed media are applied only at said backside of said plurality of pressure sense die, thereby preventing wire bonds and active regions associated with said front side of said plurality of pressure sense die from exposure to sensed media and attack from acids and abrasive chemicals associated with said sensed media, wherein said at least one ASIC comprises a single two-input ASIC;
   an over-voltage and reverse polarity protection circuit that outputs data that is fed as input to said two-input ASIC;
   an output protection circuit that receives as input, data generated by said two-input ASIC; and
   an EMC protection circuit that receives as input, data output from said output protection circuit, wherein data output from said EMC protection circuit is fed as input to said over-voltage and reverse polarity protection circuit.

7. A differential pressure sensor method, comprising the steps of:
   configuring an absolute pressure sensor to comprise a plurality of pressure sense die for detecting sensed media, wherein each of said plurality of pressure sense die possesses a back side and a front side and are respectively associated with a plurality of varying pressures;

automatically calibrating said plurality of pressure sense die utilizing at least one ASIC, wherein said at least one ASIC comprises a high port ASIC in association with a reference port ASIC;

providing an over-voltage and reverse polarity protection circuit that generates data as input to said high port ASIC and said reference port ASIC;

associating a differential circuit with a pressure pulsation circuit, wherein said differential circuit receives as input, data transmitted from said high port ASIC;

providing an output protection circuit which receives as input, data output from said differential circuit and said pressure pulsation circuit; and providing an EMC protection circuit, which receives as input, data output from said output protection circuit, wherein said EMC protection circuit outputs data which is fed as input to said over-voltage and reverse polarity protection circuit, wherein said sensed media are applied only at said backside of said plurality of pressure sense die, thereby preventing wire bonds and active regions associated with said front side of said plurality of pressure sense die from exposure to sensed media and attack from acids and abrasive chemicals associated with said sensed media.

8. The method of claim 7 wherein said plurality of pressure sense die and a hermetically sealed cover are located above a diaphragm configured from said plurality of pressure sense die, wherein said sealed cover and said diaphragm form a reference pressure cavity therebetween.

9. The method of claim 8 further comprising:

providing a housing in which said absolute pressure sensor is located in association with a carrier for maintaining said absolute pressure sensor and a circuit board populated with a plurality of surface mounted components for electrical connection to said absolute pressure sensor; and forming a pressure inlet from said carrier, wherein said pressure inlet is filled with a gel for protecting said diaphragm and at least one adhesive thereof, thereby preventing an exhaust gas, including acids and hazardous chemicals thereof from damaging said at least one pressure sense die and electrically sensitive portions thereof.

10. The method of claim 9 wherein said gel comprises a fluorsilicone gel and said at least one adhesive comprises silicone.

11. The method of claim 9 further comprising embedding a plurality of piezoresistors in said diaphragm at locations that maximize an output of said absolute pressure sensor.

* * * * *